United States Patent
Brennesholtz

(10) Patent No.: US 6,674,579 B2
(45) Date of Patent: Jan. 6, 2004

(54) COLOR CORRECTION TO TARGET WHITE POINTS BY ADJUSTMENT OF TWO COLORS

(75) Inventor: Matthew S. Brennesholtz, Pleasantville, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/822,641

(22) Filed: Mar. 30, 2001

(65) Prior Publication Data

US 2002/0141068 A1 Oct. 3, 2002

(51) Int. Cl.[7] .................. G02B 27/14; G03B 21/26; G03B 21/28
(52) U.S. Cl. .................. 359/634; 353/34; 353/37
(58) Field of Search .................. 359/634; 353/34, 353/37; 348/335, 336, 337, 338, 339; 349/9

(56) References Cited

U.S. PATENT DOCUMENTS

| 5,738,426 A | 4/1998 | Daijogo et al. ............... 353/31 |
| 5,751,384 A | 5/1998 | Sharp |
| 5,999,240 A | 12/1999 | Sharp et al. ............... 349/119 |
| 6,049,367 A | * 4/2000 | Sharp et al. ............... 349/117 |
| 6,101,040 A | 8/2000 | Itoh |
| 6,142,634 A | 11/2000 | Ogawa et al. |
| 6,327,093 B1 | * 12/2001 | Nakanishi et al. ............... 349/9 |

FOREIGN PATENT DOCUMENTS

| EP | 0397381 A2 | 11/1990 | ............ H04N/9/31 |
| EP | 1081964 A2 | 3/2001 | ............ H04N/9/31 |
| EP | 1161103 A2 | 12/2001 | ............ H04N/9/31 |
| JP | 05249428 A | 9/1993 | |
| JP | 06148592 A | 5/1994 | |
| JP | 06317777 A | 11/1994 | |
| JP | 07077689 A | 3/1995 | |
| JP | 07230069 A | 8/1995 | |
| JP | 10311968 A | * 11/1998 | ............ G02B/5/00 |
| JP | 11133353 A | 5/1999 | |
| JP | 11265029 A | 9/1999 | |
| JP | 11331866 A | 11/1999 | |

* cited by examiner

Primary Examiner—Ricky Mack
Assistant Examiner—Alicia M Harrington

(57) ABSTRACT

Partially polarized light produced by an integrator/polarization conversion system combination and two non-pixilated twisted nematic liquid crystal display cells (TN-LCD) or other light modulators are utilized. By adjusting the voltages on the TN-LCD cells, it is possible to adjust the relative amounts of the greatest two of the colors supplied, of the red, green and blue colors, used by the display without changing the light of the color in the least supply. Because all of the adjustments are done electronically through voltage controls, not mechanically, the "white" point correction system is both simple and reliable.

18 Claims, 1 Drawing Sheet

COLOR CORRECTION TO TARGET WHITE POINTS BY ADJUSTMENT OF TWO COLORS

TECHNICAL FIELD

The present invention relates generally to a method of color correction of liquid crystal display (LCD) projection or direct view displays and, more particularly, to controlling the throughput of two different color channels to control the white point of a projector.

BACKGROUND TECHNOLOGY

Many different colors are specified as "white" in both video and monitor systems. For example, in cinema work 5400K is specified as "white", but in video work 6550K is specified as "white". Ranges from 3800K to 9300K are used to specify "white" in other applications. Therefore, to enable an end user to accurately judge the color of the finished product which appears on a monitor, it is necessary to adjust the monitor "white" point to the "white" point specified for that particular application.

In CRT monitors, the specified "white" point can be attained by adjusting the relative gains of the red, green and blue video amplifiers so that when all three video signals (R, G and B) are equal, the desired target "white" is displayed. Changing the "white" point in such a system can be effected by changing the relative gain of the red, green and blue amplifiers. This manner of attaining the specified "white" point, however, has several disadvantages when it is incorporated in an LCD display. If the requisite gain is effected in the analog domain, the change not only effects the "white" point, but effects all other colors as well. Accordingly, modified gamma correction curves are then required for each target "white" point. If the gain adjustment is effected in the digital domain, some of the dynamic range must be ignored and not used. Because eight bits is generally considered the minimum number of bits required for effective color display, disregarding portions of the dynamic range will generally lead to serious color artifacts. Even with greater basic resolution, ten or twelve bits, color artifacts can result when interpolating the video signal to a smaller dynamic range.

Therefore, while these methods previously described are suitable for use in color correction for devices such as CRT monitors, these methods are not suitable for adjusting the color of a projection or direct view LCD display.

Using a fixed and variable retarder to correct color temperature, referred to as one dimensional correction, results in changing the color of the light in the illumination path. This does not permit the "white" point to be fully adjustable, limiting the adjustment to one dimension along the black body line. Accordingly, if the starting or target "white" point is not on the black body line complete adjustment of the "white" point is not possible.

Changing the relative intensity of the red, green and blue color channels, such as through the use of a ColorLink polarizer, to control the amount of light in all three R, G and B channels to reach the target "white" point over-controls the "white" point. Color space is a two-dimensional space, commonly designated x-y color coordinates. The third coordinate in this system is the brightness coordinate. Brightness does not play a role in "white" point correction. Accordingly, only a two dimensional color correction system is necessary to fully control the "white" point of an LCD display.

The present invention is directed to overcoming one or more of the problems or disadvantages associated with the relevant technology.

SUMMARY OF THE INVENTION

In the preferred embodiment of this invention, the color of a projection or direct view LCD display may be adjusted without changing the input video signal in either the analog or digital domains. Accordingly, color adjustment is effected optically and is controllable while the projector is operating. In this manner, a fully adjustable "white" point is attained which is not limited to adjustments along the black body line. In the preferred embodiment, the throughput of two different color channels is used to control the "white" point of a projection display thereby effecting two-dimensional color corrections. Partially polarized light produced by an integrator/polarization conversion system combination and two non-pixilated twisted nematic liquid crystal display cells (TN-LCD) or other light modulators are utilized. By adjusting the voltages on the TN-LCD cells, it is possible to adjust the relative amounts of the greatest two of the colors supplied, of the red, green and blue colors, used by the display without changing the light of the color in the least supply. Because all of the adjustments are done electronically through voltage controls, not mechanically, the "white" point correction system is both simple and reliable. Electronic adjustment can also easily accommodate changing end user "white" point requirements.

BRIEF DESCRIPTION OF THE DRAWINGS

In the accompanying drawings, like reference numerals indicate corresponding parts throughout.

BEST MODE FOR CARRYING OUT THE INVENTION

Figure 1:
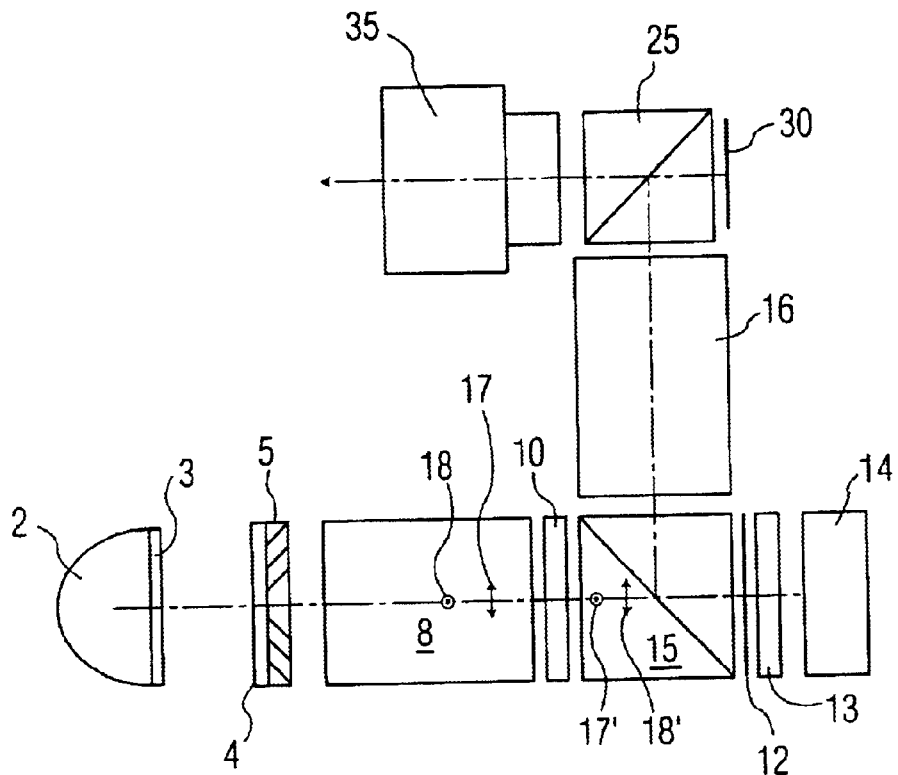
FIG. 1 is a schematic of the optical path of a reflective color drum projector utilizing a two-channel color polarizer device to control the "white" point in the manner of this invention.

Referring now to the drawings, the following is a description of the preferred embodiments of the invention utilizing the color correction method in a reflective, i.e: single panel reflective and a three-panel transmissive, liquid crystal display (LCD) projector.

Referring first to FIG. 1, there is shown a schematic of the optical path of a single panel reflective color drum projector with two ECB cells for controlling two of the colors in greatest supply such as, for example, red and green, or blue and green, to correct the "white" point without effecting the color in the shortest supply, blue or red, respectively. Such a light intensity modulator independently controls the polarization of the red, green and blue color bands, and by adjusting the two colors in greatest abundance, would provide satisfactory color control.

This method is preferably implemented by the use of a two color ColorLink color polarizer available from Color-Link Incorporated 2925 55$^{th}$ Street, Boulder, Col. 80301 and described in U.S. Pat. No. 5,751,384, positioned in the illumination path as shown in FIG. 1. For convenience of illustration, the two color polarizer 10 would be red/green, the colors assumed for purposes of illustration to be in greatest supply, with blue being the color in the shortest supply. This integrator/polarization conversion system combination and two non-pixilated twisted nematic LCD cells, provide a system for modulating the light intensity of the two colors in greatest supply, in the example red/green, among the three colors used by the display in order to adjust the "white" point of the projector by electronically controlling the voltage of the color polarizer 10.

In the embodiment illustrated in FIG. 1, there is shown a lamp and reflector 2, and a first optical integrator plate 3 in optical alignment with a second optical integrator plate 4 to provide a well defined uniform light distribution on a light polarization conversion system,(PCS) 5, positioned in the optical path to a first relay lens 8. The two color channel, red/green, ColorLink shutter or filter 10 is positioned adjacent a first polarizing beam splitter (PBS) 15 to control the red/green light passed to the PBS by the ColorLink shutter 10. The blue light from the ColorLink polarizer 10 passes straight through the PBS 15 and a quarter wave plate 12 and cylindrical lens 13 to a color drum 14 which reflects the blue light back through the lens 13 and the quarter wave plate 12. Because the two passes through the quarter-wave plate 12 has rotated the polarization of the light by 90°, the light now reflects at the first PBS 15 through a second relay lens 16.

When both the green and red channels of the ColorLink device are deactivated, the ColorLink device does not change the polarization of these two colors and they follow the same path as the blue light. In this case, all three colors reflect at the second PBS 25 onto the reflective LCD 30 where the colors are modulated separately. These modulated colors are then transmitted through the second PBS 25 and the projection lens 35 to make a color image on the projection screen (not shown). Since we have assumed for this example that there is too much green and red relative to the amount of blue in this projector, the image would be perceived by the viewer as "yellowish" compared to the target "white" point color.

FIG. 1 shows green light 17 and red light 18 in the optical path. When one channel, for example green, of the ColorLink polarizer 10 is partially activated, a portion of the green light 17 incident on the polarizer 10 has its polarization rotated 90°, and emerges as green light 17' from the polarizer 10. Some of the green light 17 incident on the polarizer 10 emerges with the original polarization from the polarizer 10. Light where the polarization was rotated (green light 17') is reflected at PBS 15 and is lost to the system. Green light where the polarization is not rotated, transmits through PBS 15 and eventually reaches the LCD 30 and the projection screen as described above. Since some green light was lost at the PBS 15 there is now less green light in the image.

Similarly, when the red channel in the ColorLink polarizer 10 is partially activated, less red light reaches the LCD 30 and the projection screen, reducing the amount of red light in the image. Namely, a portion of the red light 18 incident on the polarizer 10 has its polarization rotated by 90°, and emerges as red light 18', which is lost to the system. By controlling the degree of activation of the green and red channels of the ColorLink device, it is possible to achieve a wide variety of target "white" points at the projection screen.

In incorporating the method of this invention in a three-panel projector, for example a three-panel, single polarizing beam splitter reflective LCD projector, the projection system illustrated in FIG. 1 would be modified by substituting three-panel optics for the drum optics illustrated.

Figure 2:
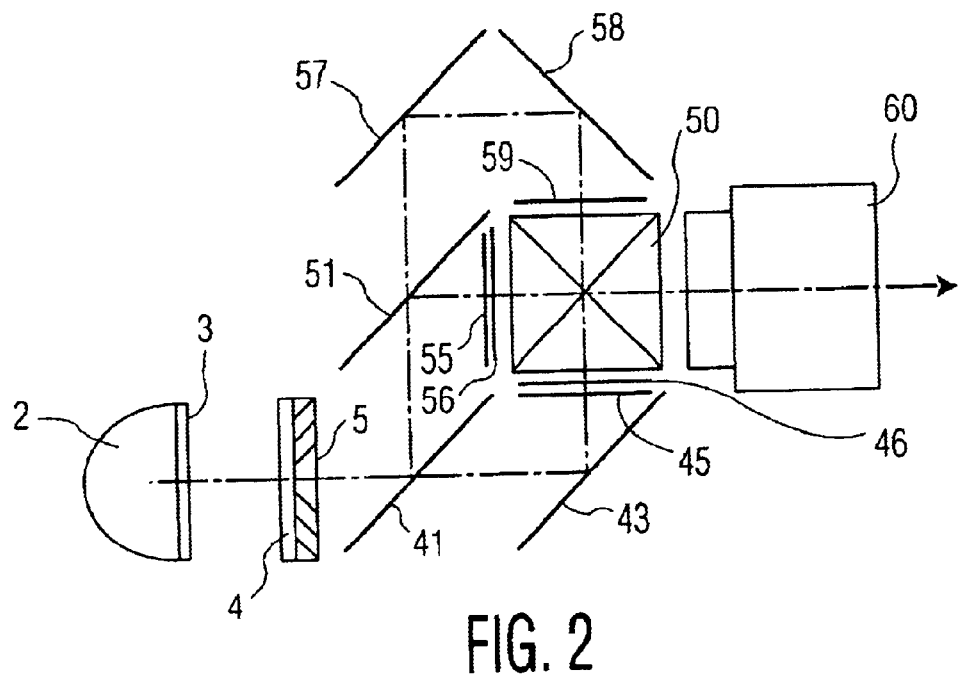
FIG. 2 is a schematic of the optical path of a three-panel transmissive liquid crystal display projector utilizing the color correction method of this invention.

In three-panel transmissive projectors and three-panel three polarizing beam splitter reflective LCD projectors, however, the method of this invention may be incorporated in the manner illustrated in FIG. 2. In such a three-panel transmissive LCD projector, the amount of light is controlled in two of the three color paths. As previously described, the amount of light is controlled in two of the color paths, those paths which have the greatest color supply which will depend on the particular lamp used, the dichroic filters applied and other optics in the system as known to those skilled in the art. Control of the two lights in the red/green color channels, which are for purposes of illustration in the greatest supply, may be effected by the use of a non-pixilated twisted nematic LCD positioned in the optical path.

As illustrated in FIG. 2, light from lamp and reflector 2 is passed through a pair of integrator plates 3 and 4, and the polarization conversion system 5, in the manner of the embodiment illustrated in FIG. 1. The light passing through the PCS 5 passes through a first dichroic mirror 41 which reflects the blue and green light to a second dichroic mirror 51. Red light passes through the first dichroic mirror 41 and is reflected by a mirror 43 through a red light color channel control 45, such as a non-pixilated twisted nematic liquid crystal display (TN-LCD) cell, an LCD with a polarizer attached 46, to a color-combining x-cube 50 positioned in the optical path to pass the controlled red light through a projection lens 60 to a projection screen, not shown.

The blue and green light is reflected by the first dichroic mirror 41 to the second dichroic mirror 51. The second dichroic mirror 51 reflects the green light to a green color channel control 55, such as a non-pixilated TN-LCD cell, an LCD with a polarizer attached 56, which passes the controlled green light to the x-cube 50 and projection lens 60 to the projection screen. The blue light is transmitted through the second dichroic mirror 51 and reflected by a pair of mirrors 57 and 58 through a blue LCD 59 into the color-combining x-cube 50 and projection lens 60 to the projection screen.

Through this embodiment, the amount of light in greatest supply, red and green, is controlled in their two respective color channels by the polarization controllers 45 and 55, respectively to control the "white" point of the projector.

FUNCTIONAL DESCRIPTION

In operation, fully adjustable "white" point control may be effected electronically through voltage controls without any mechanical components. Positioning polarization controllers for two color bands, either 10 or the pair 45 and 55, in the optical path to a projector, 35 and 60, permits the selective control of the two colors which are in the greatest abundance in the system. The controlled reduction of these abundant colors can be matched to the light intensity of the color in least supply to provide a fully adjustable "white" point correction system.

Other aspects and features of the present invention can be obtained from a study of the drawings, the disclosure, and the appended claims.

What is claimed is:

1. A method of primary color correction to obtain "white" point color control in an optical system, comprising the steps:

passing a beam of light for which color correction is desired in an optical path extending through a pre-polarizer to partially polarize said light beam;

said polarized beam of light having a first primary color of a lesser supply and two primary colors in a greater supply in said polarized beam of light;

passing said polarized beam of light through a polarization modulator that independently changes the degree of polarization of selected portions of said two primary colors in greater supply without substantially changing the polarization of said primary color in lesser supply;

independently varying the degree of polarization of said selected portions of said two primary colors in greater supply to selectively control the color supply thereof; and passing said color controlled polarized beam of light through a second polarizer.

2. The method of primary color correction of claim 1 wherein the step of independently varying the degree of polarization of said two primary colors in greater supply mutually exclusively selectively controls the color supply thereof to match the color supply of said first primary color of lesser supply.

3. The method of primary color correction of claim 1 wherein said step of passing a beam of light for which color correction is desired to partially polarize said light beam is effected by passing said beam of light through a polarization conversion system.

4. The method of primary color correction of claim 1 wherein the optical system is an LCD projector.

5. The method of primary color correction of claim 4 the LCD projector includes a rotating optical element for color separation.

6. A method of primary color correction to obtain "white" point color control in an optical system, comprising the steps of:

passing a beam of light for which color correction is desired through a pre-polarizer to partially polarize said light beam;

dividing said partially polarized light beam into three mutually exclusive primary color sub-beams, one of said sub-beams being of a primary color in lesser supply, and each of said other two sub-beams being of a separate primary color in greater supply than first primary color;

independently varying the degree of polarization of a selected portion of each of said two primary color sub-beams in greater supply; and passing each of said sub-beams through a second polarizer for forming a color corrected image.

7. The method of primary color correction of claim 6 wherein said step of passing a beam of light for which color correction is desired to partially polarize said light beam is effected by passing said beam of light through a polarization conversion system.

8. The method of primary color correction of claim 6 wherein the optical system is an LCD projector.

9. A method of primary color correction to obtain "white" point color control in an optical system, comprising the steps of:

dividing a beam of light for which color correction is desired into three sub-beams;

each one of said three sub-beams mutually exclusively being of a primary color;

said primary color of one of said sub-beams being in lesser supply than the primary color in each of said other two sub-beams;

passing each of said sub-beams of a primary color through a pre-polarizer to partially polarize said sub-beams;

independently varying the degree of polarization of selected portions of the two primary color sub-beams in greater supply than the primary color sub-beam in lesser supply to match the primary color of lesser supply; and passing each of said sub-beams through a second polarizer.

10. The method of primary color correction of claim 9 wherein said step of passing a beam of light for which color correction is desired to partially polarize said light beam is effected by passing said beam of light through a polarization conversion system.

11. The method of primary color correction of claim 9 wherein the optical system is an LCD projector.

12. A "white" point controlled optical system comprising:

a lamp for providing a beam of light;

a pre-polarizer for receiving and partially polarizing said beam of light;

said partially polarized beam of light having a first primary color of a lesser supply and two primary colors in a greater supply than said first primary color;

a polarization modulator for receiving said partially polarized beam of light;

said polarization modulator passing said first primary color of a lesser supply and operable to control the degree of polarization of selected portions of said two primary colors in greater supply without substantially changing the polarization of said primary color in lesser supply to balance the primary color supply; and a second polarizer positioned to receive the output from said polarization modulator to provide a color balanced image.

13. The "white" point controlled optical system of claim 12 wherein said pre-polarizer is a polarization conversion system.

14. The "white" point controlled optical system of claim 12 wherein the optical system is an LCD projector.

15. A "white" point controlled optical system comprising:

a lamp providing a beam of light for which color correction is desired;

a pre-polarizer positioned to receive and partially polarize said beam of light;

means for receiving and dividing said partially polarized light beam into at least three mutually exclusive primary color sub-beams;

at least one of said sub-beams being of a first primary color in a lesser supply than the other two primary colors;

at least two of said other sub-beams each being of a separate primary color in greater supply than said first primary color;

polarization modulation means positioned to receive said partially polarized sub-beams of primary color in greater supply than said first primary color to independently vary the degree of polarization of selected portions of said sub-beams to balance the color supply; and a second polarizer positioned to receive the output from said polarization modulation means for color balancing said sub-beams of primary color in greater supply to tat of said sub-beam of a first primary color in lesser supply.

16. The "white" point controlled optical system of claim 15 wherein said pre-polarizer is a polarization conversion system.

17. The "white" point controlled optical system of claim 15 wherein the optical system is an LCD projector.

18. The white point controlled optical system of claim 15 wherein said LCD projector includes three transmissive LCD panels.

\* \* \* \* \*